July 31, 1928.
N. K. KLAUSET
1,678,731
LUBRICATOR
Filed Feb. 26, 1925
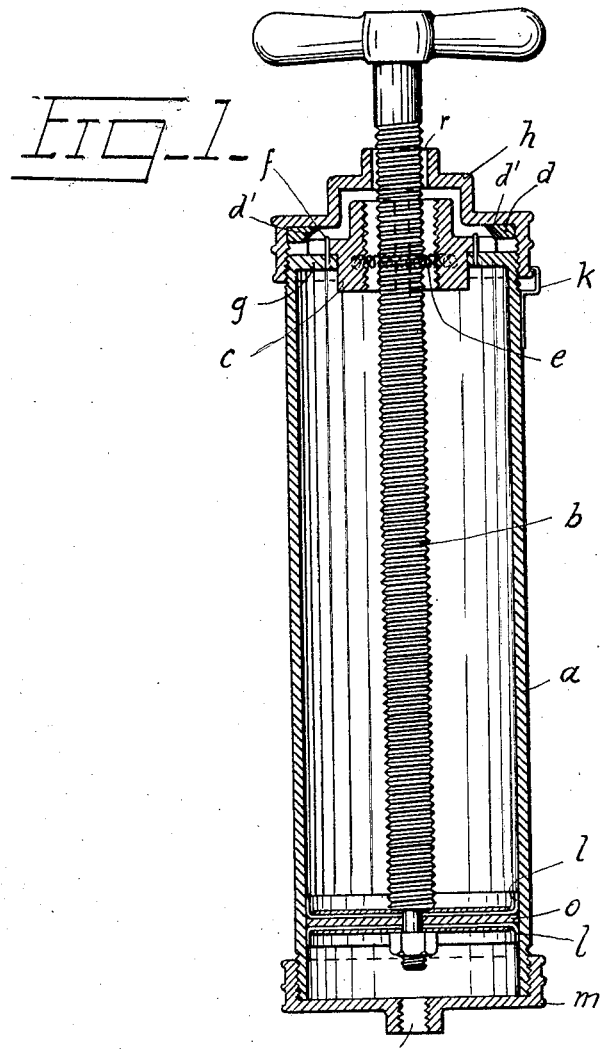
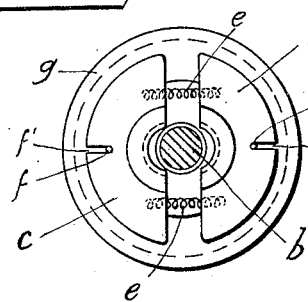
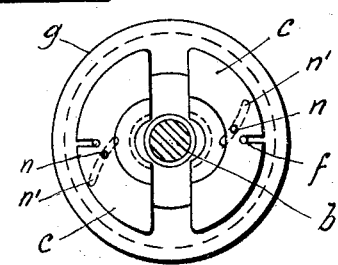
Inventor
N. K. Klauset Patented July 31, 1928.

1,678,731

UNITED STATES PATENT OFFICE.

NIKOLAI KASTBERG KLAUSET, OF CHRISTIANSAND, NORWAY.

LUBRICATOR.

Application filed February 26, 1925, Serial No. 11,856, and in Norway August 25, 1924.

The present invention relates to lubricators and especially to grease presses of the hand driven force-feed type.

The object of the invention is to provide means whereby a lubricator for grease or more or less solid lubricating compositions may be adapted for use also as oil pumps.

According to the present invention the said object is achieved by arranging a releasable engagement between the rod of the press or lubricator and the guiding nut thereof, whereby the said rod may be freely longitudinally displaced after release of the engagement, and thus serve as an ordinary piston rod.

According to the invention the said nut may be divided in two halves, each of which may, by means of suitable arrangements, be displaced in a direction normally to the axis of the said rod, whereby the nut halves are brought out of, or into, engagement with the threads of the rod.

Preferably the halves of the said nut are displaced by screwing the top lid of the press, said lid carrying means which act upon coacting means of the nut halves, whereby the said nut halves are displaced.

One constructional form of the invention is by way of example shown at the accompanying drawing where:

Fig. 1 is a sectional view of a lubricator according to the invention and

Fig. 2 is a top view of the same, the top lid being removed, and Fig. 3 is a view similar to that of Fig. 2, showing a modified form of the lubricator.

The cylinder or shell $a$ of the lubricator is, at the lower end thereof, closed by a screwed lid $m$, which is provided with a threaded outlet $p$ adapted to receive a conduit or tube of suitable type.

At the top end thereof the cylinder $a$ is provided with an inwardly projecting flange $g$ supporting a nut comprising two halves $c$, $c$. The said halves are adapted to be moved sidewards on to and away from a threaded piston rod $b$, which pass through the opening of the said divided nut. At the lower end thereof the said piston rod $b$ carries a piston $o$ provided with glands $l$, as usual. The nut halves $c$, $c$ are kept apart by means of springs $e$ arranged therebetween. Further, each nut half is provided with a slot $f'$ adapted to receive a pin $f$ secured to and projecting upward from the said flange $g$. This pin and slot arrangement serves to guide the movements of the nut halves, and to prevent their rotation about the axis of the rod $b$.

To the lower side of the top lid $h$ there is secured a ring $d$, which, if desired, also may be formed integrally with the said lid. The inner side of the said ring is formed with a face $d'$, which is oblique as regards the central axis of the apparatus. The said upper lid $h$ is screwed on the cylinder $a$, whereby the lid and accordingly also the oblique face of the ring portion, may be adjusted as regards the distance from the nut halves $c$. The piston rod $b$ pass freely through an opening $r$ in the lid $h$.

When the upper lid $h$ is screwed down on the cylinder $a$ so as to approach the nut halves $c$, the said oblique ring portion will come into contact with each nut half and press the same against the action of the springs $e$, inward into engagement with the threads of the rod $b$. If the lid $h$ is turned in the opposite direction, the said oblique surface will, of course, be removed from the nut halves, whereby the springs $e$ are allowed to move the same out of engagement with the piston rod $b$.

Other means may, however, be used to effect the movement of the nut halves on to or away from the piston rod $b$. F. inst., as shown in Fig. 3, the springs $e$ may be omitted and the nut halves $c$ guided by means of pins or lugs $n$ projecting into helical grooves $n'$ formed in the lid $h$. As the lid $h$ is supposed to have been removed in this figure, the said grooves $n'$ are indicated by dotted lines only.

To the cylinder $a$ there is secured an abutment $k$, which coacts with a flange on the top lid to limit the movement of the lid, in each direction of the movements thereof.

When the apparatus is to be filled with lubricant the nut halves are moved out of engagement with the rod $b$ by turning the lid $h$ in the correct direction. Then the piston $m$ may be directly drawn towards the top portion of the apparatus, without the need of being turned numerous times as would have been the case if the nut halves $c$ had remained in engagement with the rod $b$.

If the apparatus is to be used for sucking up and lubricating with fluid oil or the like, the same may be sucked into the apparatus when the piston $m$ is drawn back, and may again be pressed out by simply forcing the piston towards the bottom lid *m*. In this case the apparatus acts as an ordinary oil gun.

If the apparatus is to be used for a more or less solid grease, the piston is withdrawn to its uppermost position, the lower lid *m* is removed and the cylinder is then filled from below with the grease in question whereupon the lid *m* is again secured on the lower end of the apparatus. Then the lid *h* is screwed down so as to move the nut halves *c* into engagement with the rod *b*, when the more or less solid grease may be protruded through the opening in the lower lid *m* by screwing the rod *b* downward through the nut *c*.

Thus it is seen that the present invention provides for an apparatus which is equally utilizable for lubricating with liquid, semiliquid or solid lubricants, and which may also be used as an ordinary pump to suck up oil and the like, which has accumulated at certain spaces.

Having now particularly described and ascertained the nature of my said invention and in what manner the same is to be performed, I declare that what I claim is:

A device of the character described including a support, a threaded rod arranged through the support, a split nut mounted on the support for association with the threaded rod and including two parts, pin and slot connections between the nut parts and the support for positively guiding the nut parts and for holding them on the support, means for normally holding the nut parts out of engagement with the rod, and consisting of coiled springs arranged between and having their respective ends fitted in the nut parts, a member arranged about the rod and adjustably engaged with the support and including a ring for forcing the nut parts into engagement with the rod.

In testimony whereof I have signed my name to this specification.

NIKOLAI KASTBERG KLAUSET.